United States Patent [19]
Turner

[11] Patent Number: 5,403,059
[45] Date of Patent: Apr. 4, 1995

[54] VEHICLE HOOD SHIELD AND METHOD OF MOUNTING THEREOF

[75] Inventor: Douglas A. Turner, Costa Mesa, Calif.

[73] Assignee: G.T. Styling, Inc., Irvine, Calif.

[21] Appl. No.: 15,807

[22] Filed: Feb. 23, 1993

[51] Int. Cl.⁶ .............................................. B62D 35/00
[52] U.S. Cl. .................................. 296/91; 296/180.1
[58] Field of Search ................................. 296/91, 180.1

[56] References Cited

U.S. PATENT DOCUMENTS

| | | |
|---|---|---|
| D. 167,676 | 9/1952 | Chicorel . |
| D. 201,496 | 6/1965 | Stef . |
| D. 272,429 | 1/1984 | Trombley et al. . |
| D. 283,120 | 3/1986 | Trombley et al. . |
| D. 284,565 | 7/1986 | Trombley et al. . |
| D. 300,918 | 5/1989 | Turner . |
| 2,236,846 | 4/1941 | Davisson . |
| 3,015,517 | 1/1962 | Thornburgh . |
| 3,022,848 | 2/1962 | Heiser ........................... 296/91 X |
| 3,808,648 | 5/1974 | Billarant et al. . |
| 3,815,700 | 6/1974 | Mittendorf . |
| 3,817,572 | 6/1974 | Francis ........................... 296/91 |
| 4,043,587 | 8/1977 | Giallourakis et al. . |
| 4,153,129 | 5/1979 | Redmond . |
| 4,262,954 | 4/1981 | Thompson . |
| 4,347,781 | 9/1982 | Hassell ........................... 296/91 X |
| 4,471,991 | 9/1984 | Matthias . |
| 4,776,627 | 10/1988 | Hutto et al. . |
| 5,039,156 | 8/1991 | Messmore et al. . |
| 5,040,275 | 8/1991 | Eckhardt et al. . |
| 5,067,206 | 11/1991 | Metcalfe ........................ 296/91 X |
| 5,082,321 | 1/1992 | Brewer . |
| 5,094,497 | 3/1992 | Hartung et al. . |

OTHER PUBLICATIONS

G.T. Styling Bug-Gard flyer.
Letter dated Jul. 24, 1992 from Mr. Hartung to G.T. Styling.
Lund Industries Interceptor flyer, 1990.

Primary Examiner—Joseph Pape
Attorney, Agent, or Firm—Spensley Horn Jubas & Lubitz

[57] ABSTRACT

An improved shield which is readily attached or detached at the forward edge portion of a hood of a vehicle. The shield has a longitudinal member of flexible material laterally extending across the front edge of the hood. The longitudinal member has an upper section adapted to engage the upper surface of the hood and a lower section adapted to engage the underside of the hood. The longitudinal member further has a linking section linking the upper and lower sections and shaped to apply a spring force to the vehicle hood so that the vehicle hood is resiliently clamped between the upper and lower sections of the shield by the spring force.

17 Claims, 2 Drawing Sheets

VEHICLE HOOD SHIELD AND METHOD OF MOUNTING THEREOF

BACKGROUND OF THE INVENTION

1. Field of the Invention

The present invention relates to hood shields for protecting the hood and windshield of a vehicle.

2. Description of Related Art

A vehicle travelling at highway speeds creates fast moving air currents which generally follow the external surface of the vehicle. Air currents may carry debris and other objects such as dirt, stone chips, insects, etc. which may strike and damage the leading edges of the hood and the windshield of the vehicle.

A variety of shields and deflectors have been developed to protect the leading edge areas of the vehicle hood and to deflect debris and other objects carried in the air currents away from and over the front windshield of the vehicle. To attach the shield to the vehicle hood, a variety of different methods have been employed. In one type of shield, nut and bolt fastening devices are used to secure the shield to the vehicle hood. However, such bolt-nut fastening devices typically require drilling holes through the hood or other parts of the vehicle. In order to avoid drilling holes in the body of the vehicle, another type of shield uses straps to attach the shield to the vehicle hood. Generally, these prior shields are not readily attached to or detached from the vehicle hood to allow cleaning and polishing under the shield.

SUMMARY OF THE INVENTION

It is an object of the present invention to provide an improved hood shield and deflector which obviates, for practical purposes, the above-mentioned limitations, particularly in a manner requiring a relatively uncomplicated mechanical arrangement.

These and other objects and advantages are achieved in an improved shield and deflector which is readily attached to or detached from the forward edge portion of a hood of a vehicle. In accordance with one embodiment of the present invention, the shield comprises a single piece of resilient, flexible material having a central forward portion shaped to conform generally to the contour of the forward edge portion of the vehicle hood. The central forward portion has an upper section adapted to engage the upper surface of the vehicle hood and a lower section adapted to engage the underside of the vehicle hood. The central forward portion further has a linking section linking the upper and lower sections. As will be discussed in greater detail below, the linking section is shaped to apply a compressive spring force to the vehicle hood so that the vehicle hood is clamped between the upper and lower sections of the shield central forward portion by the spring force. In one embodiment, reclosable fasteners are used to further secure the shield to the hood. Such an arrangement has been found to allow the shield to be securely locked in position to the hood and yet readily detached or reattached as desired.

BRIEF DESCRIPTION OF THE DRAWINGS

FIG. 3 B is a cross-sectional view of the hood shield and deflector of FIG. 1 taken along the lines 3—3, with a partial cross-sectional view of the hood having a different shape, in which a clip is used for holding a bottom flange of the hood shield and deflector in place against an under flange of the hood;

DETAILED DESCRIPTION OF THE DRAWINGS

Figure 1:
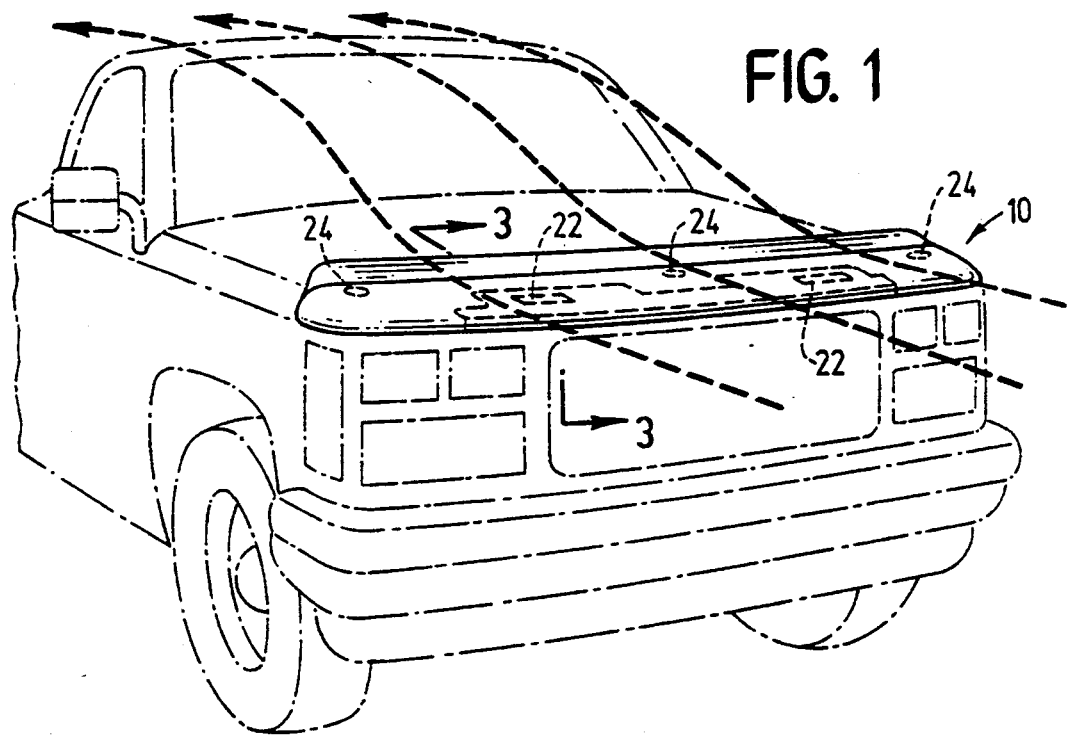
FIG. 1 is a perspective view illustrating a hood shield and deflector in accordance with a preferred embodiment of the present invention.
Figure 2:
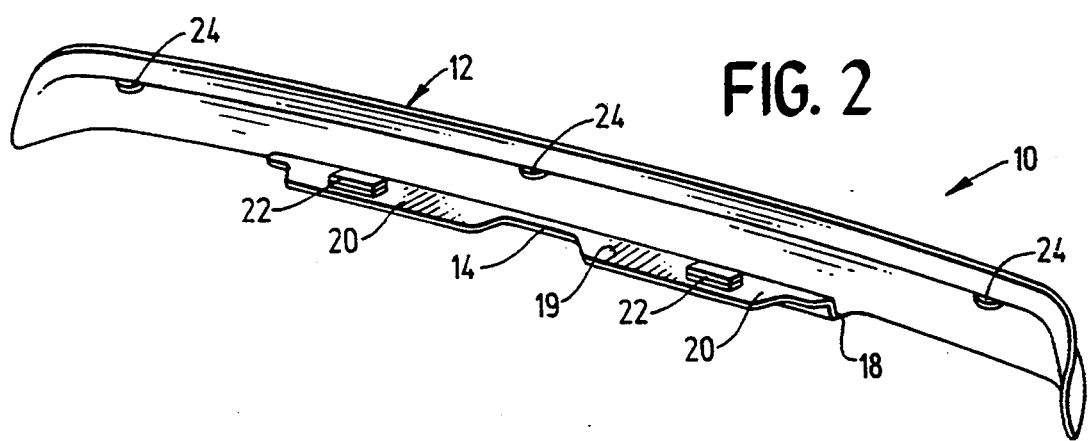
FIG. 2 is a rear perspective view of the hood shield and deflector of FIG. 1.
Figure 3A:
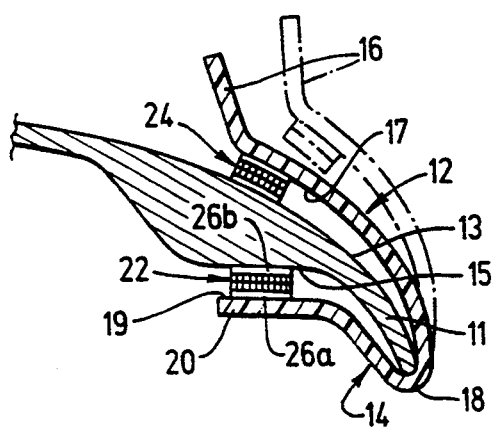
FIG. 3 A is a cross-sectional view of the hood shield and deflector of FIG. 1 taken along the lines 3—3 with a partial cross-sectional view of the hood.

A shield in accordance with a preferred embodiment of the present invention is indicated generally at 10 as illustrated in FIGS. 1-3. The shield 10 is mounted along a forward edge portion 11 of a hood of a vehicle to protect the forward edge portion of the hood. The shield 10 may be provided with an air current deflector 16 to deflect the air currents over and away from the front windshield to protect the windshield from debris and other objects being carried in the air currents. The vehicle may be any of a variety of types, such as pick-up trucks, mini-vans, sports cars or the like which include a front located hood. The shield 10 is generally formed by a one piece, resilient and flexible thermoplastic material having a sufficient impact resistance. In the illustrated embodiment, the shield 10 is formed into an elongated form so that the shield 10 generally spans across the lateral width of the vehicle, or alternatively across the lateral width of the hood.

In the illustrated embodiment, the shield 10 generally has an upper section 12, a lower section 14 which generally opposes the upper section 12, and a generally upwardly oriented trailing end portion 16 which connects to the upper section 12. The upper section 12 covers the frontal edge portion of the hood and also an area immediately above the frontal edge of the hood to protect the surfaces of these areas from debris, stone chips, insects, etc. carried in the air currents which would otherwise impinge the painted surface of the frontal edge areas of the hood. It should be appreciated that the surface of the frontal edge portion 11 of the hood is generally aerodynamically curved to streamline the air currents. In accordance with one aspect of the invention, the upper section 12 is shaped to generally conform to the curve of the surface of the frontal edge portion 11 of the hood. As a result, the installation of the shield 10 to the frontal end portion of the hood does not substantially increase air resistance.

The rearward portion of the upper section 12 connects to the generally upwardly oriented trailing end portion 16 to define the air current deflector. The air currents initially hit the frontal edge portion of the upper section 12, follow rearwardly along the external surface of the upper section 12 and are deflected at the upwardly oriented trailing end portion 16. As a result, contaminants such as debris, sand or insects carried in the air currents which would otherwise hit the windshield are deterred or prevented from hitting the windshield.

The lower section 14, which is intended to extend under the frontal edge portion 11 of the hood, connects to the upper section 12 through a generally U-shaped front edge linking portion 18. The lower section 14 generally confronts the upper section 12 and is formed to generally conform to the surface of the under side of the frontal edge portion 11 of the hood so that the upper section 12, the U-shaped front edge portion 18 and the lower section 14 snugly fit over the frontal edge portion 11 of the hood. As noted, above, the shield 10 is preferably formed by a one-piece, thermoplastic material having a sufficient impact resistance and strength, such as a flexible, transparent polymeric plexiglas material. Thus, the shield 10 formed into a generally U-shaped cross-section has a substantial resilience between the upper section 12 and the lower section 14 through the linking portion 18.

In the illustrated embodiment, the lower section 12 further has laterally extending flanges 20 to conform to the lower surface of the frontal edge portion 11 of the hood. Preferably, the lower section 14 may be made shorter than the length of the upper section 12 and may be centrally located along the lateral span of the upper section 12 to reduce the weight of the shield 10 and to facilitate the attachment and detachment of the shield 10.

In accordance with a preferred embodiment of the present invention, when unflexed, the distance between the flanges 20 and the upper section 12 is smaller than the thickness of the corresponding area of the frontal end portion 11 of the hood. As a result, when the shield 10 is flexed and fitted over the frontal edge portion 11 of the hood, the upper section 12 and the lower section 14 resiliently grip the frontal edge portion 11 with a substantially large compressive force.

To additionally secure the attachment of the shield 10 to the hood of a vehicle, the shield 10 is provided with a fastening device 22 on an inner surface 19 of the flange 20. The fastening device 22 may be of any suitable type including screw fastening devices. However, in a preferred embodiment of the present invention, the fastening device 22 may comprise reclosable fastening systems, such as hook and loop fasteners, or more preferably Dual Lock TM reclosable fastener manufactured by 3M. As shown in the figures, one half 26a of the reclosable fasteners tapes 22 is adhered to the inner surface 19 of each of the flanges 20. The other half 26b of the reclosable fasteners tapes may be adhered to the under side surface of the frontal edge portion 11 of the hood at a location corresponding to the reclosable fastener half 26a provided on each of the flanges 20. The two halves 26a and 26b of the reclosable fastener 22 releasably engage each other as shown in FIG. 3 A. The fastener 22 operates in conjunction with the compression force of the linking portion 18 to firmly hold the shield 10 in place.

Figure 3B:
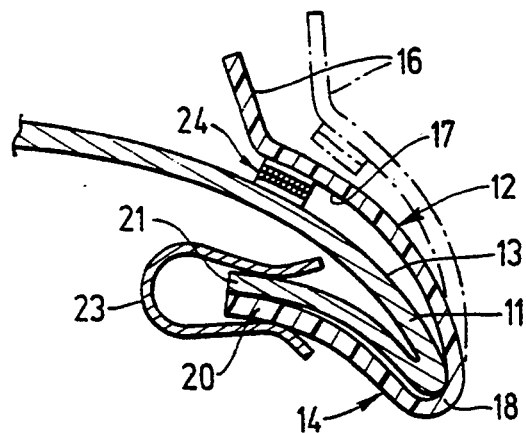
Figure 4:
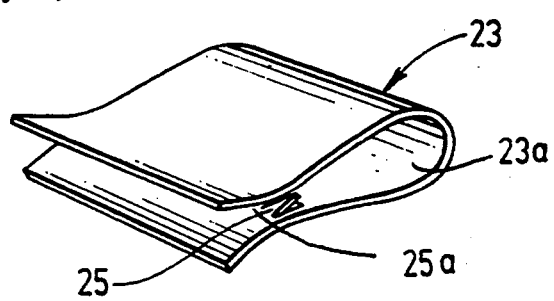
FIG. 4 is a perspective view of the clip.

In another preferred embodiment of the present invention, a clip 23 may be used to hold the flange 20 in place against an under flange 21 of the hood as shown in FIG. 3B. In some applications, the clearance between the vehicle hood and the grill when the hood is closed may not provide sufficient space to receive the lower flange 20 of the shield 10 if the lower flange is spaced from the hood by the thickness of the fastener tape 22. In those applications, one or more spaced clips 23 may be substituted for the fastener 22 to further secure the shield 10 in space. As shown in FIG. 3B, each clip 23 has a generally C-shaped cross-section, and is made of a thin resilient material such as, for example, a spring steel, to resiliently grip the shield flange 20 and the under flange 21 of the hood together. As shown in FIG. 4, the clip 23 may be provided with a barb 25 on a lower internal surface thereof to further ensure the stability of the shield 10 with respect to the hood. The barb 25 has a sharp projection 25a extending backward generally toward a rear interior wall 23a of the clip 23. As a result, the barb 25 bits into the external surface of the shield flange 20 if the clip 23 moves away from the shield flange 20. It has been found that the barb 25 is effective in keeping the clip 23 from sliding off the shield flange 20.

As noted above, the surface of the frontal edge portion 11 of the hood is generally aerodynamically curved to streamline the air currents, and the upper section 12 of the shield 10 is formed to generally conform to the curved surface of the frontal edge portion 11 of the hood. As a result, the air currents, which follow rearwardly along the external surface of the upper section 12, can create aerodynamic lifting forces. When the vehicle is travelling at high speed, it has been found that the upper section 12 of the shield 10 can be lifted by this aerodynamic force and flip back to the original configuration due to the flexibility of the thermoplastic material used for the shield 10. These motions, when repeated, can result in fluttering of the curved trailing end portion 16 of the shield 10.

Figure 5:
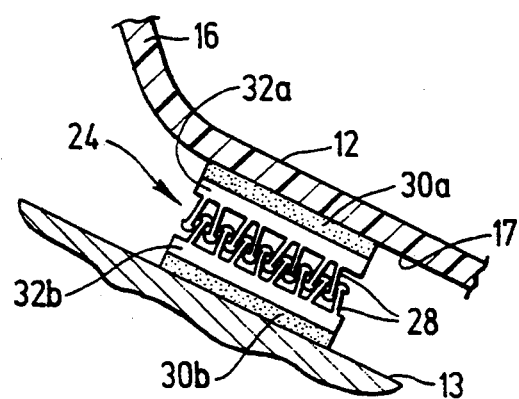
FIG. 5 is a cross-sectional view of a fastener of the hood shield and deflector and FIG. 1.

To counteract these forces, the air streaming deflector shield 10, in accordance with one aspect of the present invention, has a further stabilizing and securing device 24 which is provided on an inner surface 17 of the upper section 12. The securing device 24 further ensures secure attachment of the shield 10 to the hood of the vehicle in addition to the compression force of the linking portion 18 and the fastening device 22 which is provided on the lower section 14. In the illustrated embodiment, the securing device 24 is formed from reclosable fasteners to facilitate installation of the shield 10 to the hood. It should be noted that the securing device 24 also serves as a spacer to provide a spacing between the upper section 12 and the upper surface of the frontal end portion 11 of the hood so that the upper section 12 does not touch the upper surface of the hood. For this purpose, the securing device 24 should preferably have a sufficient rigidity to retain a predetermined thickness and a sufficient bonding force to securely anchor the upper section 12 to the hood. In accordance with one embodiment of the present invention, the securing device 24 comprises fastening strip halves 32a and 32b which have numerous upstanding mushroom-shaped stems 28, as best seen in FIG. 5. The mushroom-shaped stems 28 are substantially rigid and therefore, unlike typical hook and loop fastening tapes, resist compression forces and substantially retain their original height under substantial compression forces. Dual Lock TM reclosable fastener manufactured by 3M has been found to provide very satisfactory results as the securing device 24.

One half 32a of the fastening strips 24 is attached to the inner surface 17 of the upper section 12 by an adhesive layer 30a. The other half 32b of the fastening strips 24 is attached to the upper surface 13 of the hood by a similar adhesive layer 30b at a location corresponding to the upper fastening strip 32a provided on the shield 10. In the illustrated embodiment, as shown in FIGS. 1 and 2, three sets of fastening strips 24 are attached to the inner surface 17 of the upper section 12 along the length of the shield 10 at three locations, generally at center and adjacent to both ends of the shield 10. Also, the securing devices 24 are provided adjacent to the trailing end portion 16 of the shield 10 to minimize the length of a free end portion of the upper section 12 in order to provide an optimum stabilizing effect. However, it is anticipated that the fastening strips 24 may be provided at other locations depending on the configuration of the hood of a vehicle.

The fastening strip half 32a which is adhered to the shield 10 initially carries the fastening strip half 32b before the shield 10 is attached to the vehicle hood. In a similar manner, the fastening strip half 26a adhered to the flange 20 carries the associated fastening strip half 26b. The tape halves 26b and 32b each have a backing member (not shown) covering its associated adhesive layer. To install the shield, the shield 10 is slid onto the frontal edge portion 11 of the hood. The backing members of the halves 26b of the tapes 22 are removed and the flange 20 is firmly pressed against the underside surface 15 of the frontal end portion 11 of the hood thereby adhering the strip halves 26b to the underside of the hood. While maintaining the pressure against the underside surface 15, the trailing end portion 16 of the shield 11 is pulled forward to provide a space between the fastening strip 32b and the upper surface 13 of the hood. The backing members of the strip halves 32b are removed from the associated adhesive layer 30b and the upper section 12 of the shield 10 is then firmly pressed down at mounting locations, which have been previously marked, to seat the adhesive layer 30b of each strip half 32b to the top surface of the hood.

After a suitable curing period, preferably 24 hours or more, the shield 10 may be easily removed from the hood by separating the shield tape halves 26a and 32a from their corresponding hood tape halves 26b and 32b. Conversely, the shield 10 is readily reinstalled by mating the shield tape halves 26a and 32a with their associated hood tape halves 26b and 32b. The compression force supplied by the linking section 18 further retains the shield 10 in place, even at highway speeds.

While the invention has been described with respect to the illustrated embodiments in accordance therewith, it will be apparent to those skilled in the art that various modifications and improvements may be made without departing from the scope and spirit of the invention. For example, the fastening device 22 provided on the lower section 14 may be omitted. Other embodiments are also possible, their specific designs depending upon the particular application. As such, the scope of the invention should not be limited by the particular embodiments herein described but should be defined only by the appended claims and equivalents thereof.

I claim:

1. A shield for substantially preventing air currents from striking the forward edge portion of the hood of a vehicle comprising:
    a resilient, flexible member extending substantially the width of the forward edge portion of the vehicle hood and shaped to conform generally to the contour of the forward edge portion of the vehicle hood, said member having a forward resilient clamp portion having an upper shield section adapted to engage the upper surface of the vehicle hood for substantially preventing air currents from striking the vehicle hood forward edge portion, a lower section adapted to engage the underside of the vehicle hood and a linking section linking the upper and lower sections and shaped to apply a spring force to the vehicle hood so that the vehicle hood is clamped between the upper and lower sections of the shield forward portion by the spring force applied by the shield forward portion to thereby secure the shield to the forward edge portion of the hood.

2. The shield of claim 1, wherein the shield forward portion may be flexed from an unflexed state to a flexed state prior to being mounted to the hood, wherein in the unflexed state, the separation between the upper section and the lower section of the shield forward portion is smaller than the thickness of the forward edge portion of the hood.

3. A shield for mounting to the forward edge portion of the hood of a vehicle comprising:
    a resilient, flexible member having a central forward resilient clamp portion shaped to conform generally to the contour of the forward edge portion of the vehicle hood, said central forward portion having an upper shield section adapted to engage the upper surface of the vehicle hood for substantially preventing air currents from striking the vehicle hood forward edge portion, a lower section adapted to engage the underside of the vehicle hood and a linking section linking the upper and lower sections and shaped to apply a spring force to the vehicle hood so that the vehicle hood is clamped between the upper and lower sections of the shield central forward portion by the spring force applied by the shield central forward portion,
    wherein the shield central forward portion may be flexed from an unflexed state to a flexed state prior to being mounted to the hood, wherein in the unflexed state, the separation between the upper section and the lower section of the shield central forward portion is smaller than the thickness of the forward edge portion of the hood; and
    first means for securing the shield central forward portion upper section to the upper side of the vehicle hood.

4. The shield of claim 3, further comprising second means for securing the shield central forward portion lower section to the underside of the vehicle hood.

5. The shield of claim 4, wherein said second means includes a second reclosable fastener attached to an inner surface of the lower section.

6. A shield for mounting to the forward edge portion of the hood of a vehicle comprising:
    a resilient, flexible member having a central forward portion shaped to conform generally to the contour of the forward edge portion of the vehicle hood, said central forward portion having an upper section adapted to engage the upper surface of the vehicle hood, a lower section adapted to engage the underside of the vehicle hood and a linking section linking the upper and lower sections and shaped to apply a spring force to the vehicle hood so that the vehicle hood is clamped between the upper and lower sections of the shield central forward portion by the spring force applied by the shield central forward portion,
    wherein the shield central forward portion may be flexed from an unflexed state to a flexed state prior to being mounted to the hood, wherein in the unflexed state, the separation between the upper section and the lower section of the shield central forward portion is smaller than the thickness of the forward edge portion of the hood; and
    first means for securing the shield central forward portion upper section to the upper side of the vehicle hood wherein the first means includes a first reclosable fastener located adjacent to a trailing end of the shield central forward upper section.

7. The shield of claim 6, wherein the first reclosable fastener has numerous substantially rigid mushroom-shaped stems of a predetermined height to space the upper surface of the hood forward portion from the upper section of the member so that the upper section does not touch the upper surface of the hood.

8. The shield of claim 6, further comprising second means for securing the shield central forward portion lower section to the underside of the vehicle hood, said second means including a second reclosable fastener attached to an inner surface of the lower section.

9. The shield of claim 8, wherein each of the first reclosable fastener and the second reclosable fastener has numerous substantially rigid mushroom-shaped stems of a predetermined height to space the piece from the forward edge portion of the hood so that the member does not touch the hood.

10. A shield for mounting to the forward edge portion of the hood of a vehicle comprising:
a resilient, flexible member having a central forward portion shaped to conform generally to the contour of the forward edge portion of the vehicle hood, said central forward portion having an upper section adapted to engage the upper surface of the vehicle hood, a lower section adapted to engage the underside of the vehicle hood and a linking section linking the upper and lower sections and shaped to apply a spring force to the vehicle hood so that the vehicle hood is clamped between the upper and lower sections of the shield central forward portion by the spring force applied by the shield central forward portion,
wherein the shield central forward portion may be flexed from an unflexed state to a flexed state prior to being mounted to the hood, wherein in the unflexed state, the separation between the upper section and the lower section of the shield central forward portion is smaller than the thickness of the forward edge portion of the hood;
first means for securing the shield central forward portion upper section to the upper side of the vehicle hood; and
second means for securing the shield central forward portion lower section to the underside of the vehicle hood;
wherein said hood has a front under flange, and said second means includes a clip for fastening the shield central portion lower section to the front under flange of the hood.

11. The shield of claim 10, wherein said clip is formed by a spring steel for resiliently holding the shield central portion lower section against the front under flange of the hood.

12. The shield of claim 9, wherein said clip has a rear interior wall and includes a barb provided on an internal surface thereof and extending generally toward the rear interior wall.

13. A one-piece shield of resilient, flexible material for mounting to the forward edge portion of the hood of a vehicle comprising:
a longitudinal front edge linking section formed to generally conform to a contour of the forward edge portion of the hood;
a longitudinal upper section connected to the longitudinal front edge linking section and transversely extending across the hood, the longitudinal upper section facing an upper surface of the hood forward edge portion;
a plurality of lower flanges connected to the longitudinal front edge linking section, the lower flanges facing a lower surface of the hood forward edge portion, wherein the longitudinal upper section, the longitudinal front edge linking section and each of the lower flanges define an internal surface generally conforming to a cross-section of the forward edge portion of the hood and shaped to apply a spring force to the vehicle hood so that the vehicle hood is clamped between the longitudinal upper section and the lower flanges by the spring force;
a deflector section connected to the longitudinal upper section for deflecting air stream away from a windshield of the vehicle;
at least one first reclosable fastener attached to an inner surface of the longitudinal upper section; and
a second reclosable fastener attached to an inner surface of each of the lower flanges.

14. A shield of claim 13, wherein a separation between the longitudinal upper section and each of the lower section is smaller than a thickness of the forward edge portion of the hood.

15. An air streaming deflector shield of claim 13, wherein the first reclosable fastener has mushroom-shaped stems of a predetermined height to provide a spacing between the upper surface of the hood forward portion and the longitudinal upper portion so that the longitudinal upper portion does not touch the upper surface of the hood.

16. An air streaming deflector shield of claim 13, wherein the first reclosable fastener is located removed from the longitudinal front edge linking section for reducing fluttering of the longitudinal upper portion and the deflector portion caused by aerodynamic lift.

17. An air streaming deflector shield of claim 13, wherein the first reclosable fastener is located adjacent to the deflector portion to thereby reduce fluttering of the longitudinal upper portion and the deflector portion caused by aerodynamic lift.

* * * * *